(12) United States Patent
Sugie (10) Patent No.: US 11,622,172 B2
(45) Date of Patent: Apr. 4, 2023

(54) IMAGE CAPTURE APPARATUS AND CONTROL METHOD FOR A DISPLAY CONTROL OF A LENS BRIGHTNESS

(71) Applicant: CANON KABUSHIKI KAISHA, Tokyo (JP)

(72) Inventor: Kazuhiko Sugie, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/565,264

(22) Filed: Dec. 29, 2021

(65) Prior Publication Data
US 2022/0224837 A1 Jul. 14, 2022

(30) Foreign Application Priority Data

Jan. 14, 2021 (JP) .............................. JP2021-004499

(51) Int. Cl.
*H04N 23/667* (2023.01)
*H04N 23/55* (2023.01)
*H04N 23/67* (2023.01)
*H04N 23/71* (2023.01)
*H04N 23/73* (2023.01)

(52) U.S. Cl.
CPC .......... *H04N 23/667* (2023.01); *H04N 23/55* (2023.01); *H04N 23/67* (2023.01); *H04N 23/71* (2023.01); *H04N 23/73* (2023.01)

(58) Field of Classification Search
CPC ............. H04N 5/23245; H04N 5/2254; H04N 5/23212; H04N 5/2351; H04N 5/2353; H04N 5/232935; H04N 5/2352; H04N 23/667; H04N 23/55; H04N 23/67; H04N 23/71; H04N 23/73; H04N 23/632; H04N 23/72
See application file for complete search history.

(56) References Cited

U.S. PATENT DOCUMENTS

| | | | |
|---|---|---|---|
| 9,800,776 B2* | 10/2017 | Uchida | H04N 5/238 |
| 2016/0286109 A1* | 9/2016 | Noda | H04N 5/238 |
| 2017/0171460 A1* | 6/2017 | Irie | G02B 7/28 |
| 2021/0250517 A1* | 8/2021 | Mashimo | H04N 5/23222 |

FOREIGN PATENT DOCUMENTS

| | | |
|---|---|---|
| JP | 6154081 B | 6/2017 |
| WO | 2016/035643 A1 | 3/2016 |

* cited by examiner

*Primary Examiner* — Luong T Nguyen
(74) *Attorney, Agent, or Firm* — Cowan, Liebowitz & Latman, P.C.

(57) ABSTRACT

An image capture apparatus sets a first value relating to an aperture diameter, and performs display control when displaying on a display unit a plurality of settable first values including the first value currently set in the image capture apparatus. The image capture apparatus controls such that, when a first range in which changes in the first values and changes in second values indicating a lens brightness that are different from the first values are proportional and a second range in which the changes in the first values and the changes in the second values are not proportional are present as the plurality of settable first values, the changes in the first values are displayed discretely in the second range with reference to the changes in the second values.

11 Claims, 6 Drawing Sheets

IMAGE CAPTURE APPARATUS AND CONTROL METHOD FOR A DISPLAY CONTROL OF A LENS BRIGHTNESS

BACKGROUND OF THE INVENTION

Field of the Invention

The present invention relates to a technique for a display control of a lens brightness.

Description of the Related Art

An apodization (APD) filter (hereinafter, APD filter) is an example of an optical filter that is mounted on the lens and is for improving a blurred image. The APD filter is configured so that a transmittance decreases the further away the distance is from an optical axis center in a direction perpendicular to the optical axis, the outline of the blurred image becomes smooth by using the APD filter, and two-line blurring and ring blurring is alleviated. In scenes where shallow depth of field is desired, such as portrait photography and macro photography, the background image becomes a soft blurred image of the outline, a high-quality image in which a main subject in focus shown up is obtained.

The APD filter has characteristics in which the transmittance of a peripheral portion decreases with respect to the optical axis center as described above, that is, in the F-numbers and T-values indicating a lens brightness, amounts of changes in the T-values (the value obtained by adding the transmittance to the F-number of the lens) with respect to the changes in the F-numbers decrease as the F-numbers become opening side. Therefore, in the lens on which the APD filter is mounted, there is a range in which the relationship between the changes in the F-numbers and the changes in the T-values is not proportional.

Japanese Patent No. 6154081 discloses a technique for separately performing an AF control and an AE control for the deviation of the ratio of the changes in T-values to the changes in F-numbers. Further, a method of notifying a user of a state of an optical brightness by displaying the T-values obtained by adding the transmittance to the F-numbers of the lens on which the APD filter is mounted is known.

Although the camera often displays the state of the optical brightness of the lens in F-number, if the optical brightness of the lens as in the APD filter is displayed in the T-values, it may be difficult for the user to know the state of the F-number of the lens (aperture diaphragm) or the relationship between the F-number set by the user and the T-value.

SUMMARY OF THE INVENTION

The present invention has been made in consideration of the aforementioned problems, and realizes techniques for enabling a user to set a first value while easily grasping a relationship between first values relating to an aperture diameter and second values indicating a lens brightness that are different from the first values.

In order to solve the aforementioned problems, the present invention provides an image capture apparatus comprising: an image capturing unit configured capture a light flux of a subject incident through an aperture; at least one processor or circuit configured to perform the operations of the following units; a setting unit configured to set a first value relating to an aperture diameter; and a display control unit configured to perform display control when displaying on a display unit a plurality of settable first values including the first value currently set in the image capture apparatus, wherein the display control unit controls such that, when a first range in which changes in the first values and changes in second values indicating a lens brightness that are different from the first values are proportional and a second range in which the changes in the first values and the changes in the second values are not proportional are present as the plurality of settable first values by the setting unit, the changes in the first values are displayed discretely in the second range with reference to the changes in the second values.

In order to solve the aforementioned problems, the present invention provides a method of controlling an image capture apparatus having an image capturing unit configured to capture a light flux of a subject incident through an aperture, the method comprising: setting a first value relating to an aperture diameter; and performing display control when displaying on a display unit a plurality of settable first values including the first value currently set in the image capture apparatus, wherein in the display control, when a first range in which a change in the first value and a change in a second value indicating a lens brightness that are different from the first value are proportional and a second range in which the change in the second value is not proportional are present as the plurality of the first values that can be set in the setting, it is controlled such that a change in the first value is displayed discretely in the second range with reference to a change in the second value.

In order to solve the aforementioned problems, the present invention provides a non-transitory computer-readable storage medium storing a program that causes a computer to execute a method of controlling an image capture apparatus having an image capturing unit configured to capture a light flux of a subject incident through an aperture, the method comprising: setting a first value relating to an aperture diameter; and performing display control when displaying on a display unit a plurality of settable first values including the first value currently set in the image capture apparatus, wherein in the display control, when a first range in which a change in the first value and a change in a second value indicating a lens brightness that are different from the first value are proportional and a second range in which the change in the second value is not proportional are present as the plurality of the first values that can be set in the setting, it is controlled such that a change in the first value is displayed discretely in the second range with reference to a change in the second value.

According to the present invention, the user can set the first value while easily grasping the relationship between the first values relating to the aperture diameter and the second values indicating the lens brightness that are different from the first values.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

[First Embodiment]

Hereinafter, an embodiment in which an image capture apparatus of the present invention is applied to a digital camera of an interchangeable lens type will be described in detail with reference to the accompanying drawings.

The image capture apparatus of the present invention is not limited to a digital camera of an interchangeable lens type, and, for example, a lens may be incorporated in the camera. Further, the image capture apparatus of the present invention is not limited to the digital camera, the present invention is applicable with apparatuses which have a camera function and can set F-numbers relating to an aperture diameter and T-values relating to a transmittance of a light transmitted through the lens.

Figure 1:
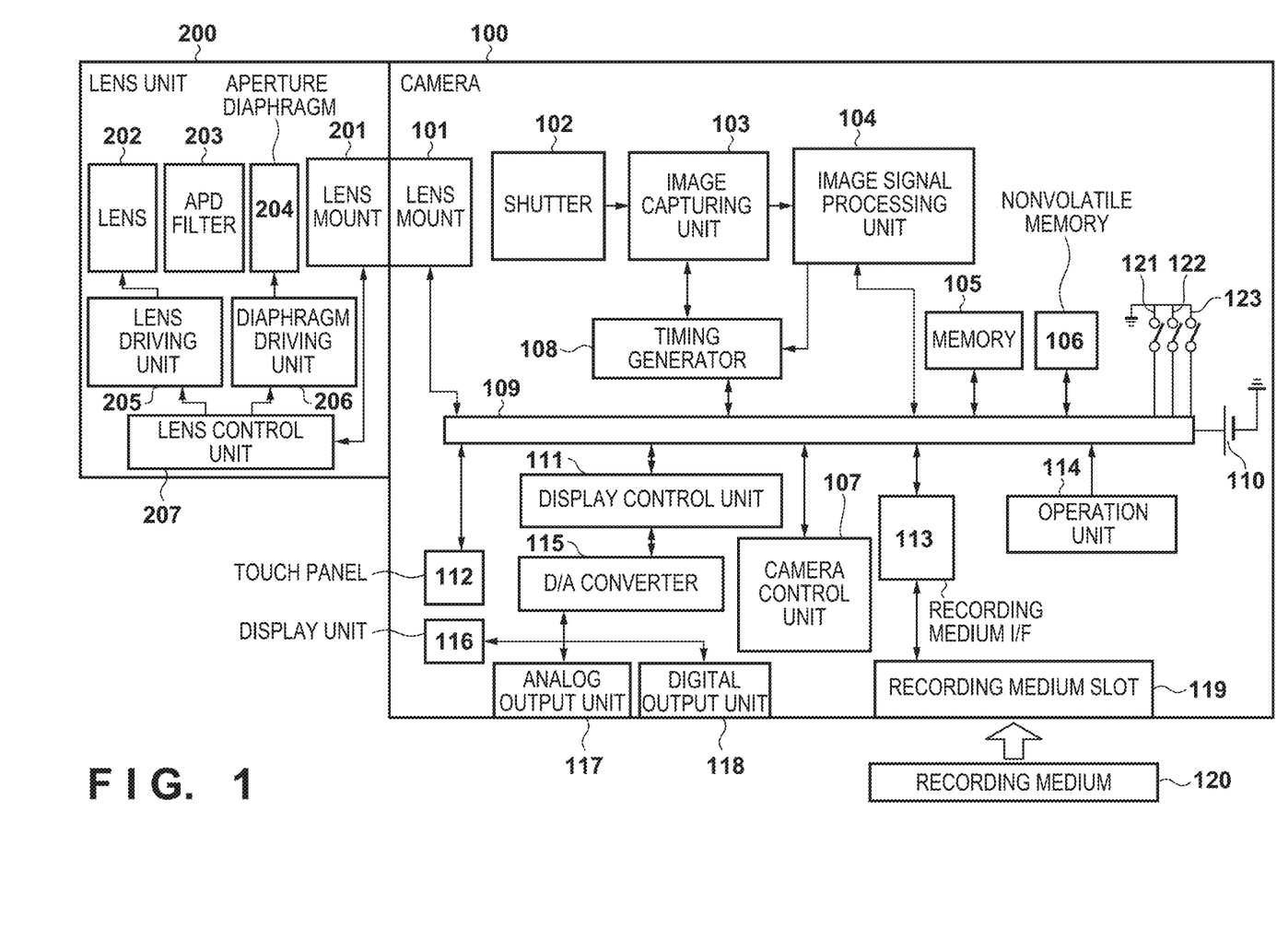
FIG. 1 is a block diagram illustrating configuration of a camera and a lens unit according to a present embodiment.

With reference to FIG. 1, the configuration and functions of the digital camera (hereinafter, camera) and the lens unit according to the present embodiment will be described.

FIG. 1 is a block diagram illustrating the configuration of the camera 100 and the lens unit 200 according to the present embodiment.

First, the configuration and functions of the lens unit 200 will be described.

In FIG. 1, the lens unit 200 includes a lens mount 201, a lens 202, an APD (apodization) filter 203, an aperture diaphragm 204, a lens driving unit 205, a diaphragm driving unit 206, a lens control unit 207, and is attachable to/detachable from the camera 100. The lens mount 201 has a connection mechanism for mechanically connecting the lens unit 200 to the camera 100, and a communication terminal for communicatively connecting the lens unit 200 to the camera 100. The lens 202 includes a plurality of lenses such as a zoom lens and a focus lens. The lens control unit 207 is an arithmetic processing unit such as a CPU or an MPU that controls the entire lens unit 200. The lens control unit 207 communicates with the camera control unit 107 of the camera 100 via the lens mount 201 and the camera mount 101 of the camera 100, sets an appropriate exposure state by adjusting the aperture diameter of the aperture diaphragm 204 by controlling the diaphragm driving unit 206, and focuses on by changing the position of the lens 202 by controlling the lens driving unit 205.

In the lens unit 200, the APD filter 203 is mounted on an optical path downstream of the lens 202 and upstream of the aperture diaphragm 204.

Figure 2:
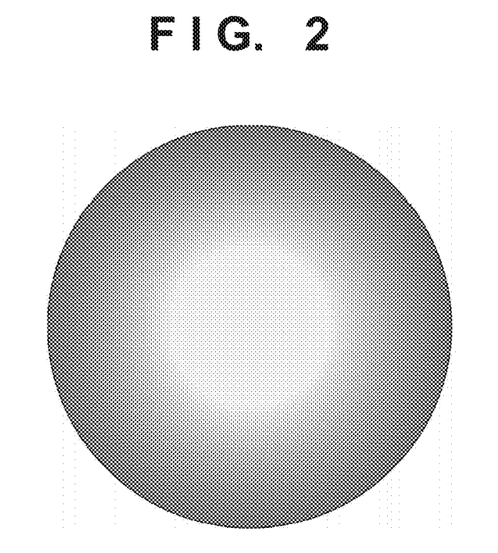
FIG. 2 is a diagram illustrating an APD filter according to the present embodiment.

FIG. 2 is a diagram illustrating the APD filter 203. An optical density or an optical transmittance is used as an index representing optical characteristics of the APD filter 203. Light amount represented by the T-value is expressed from the light transmittance P and the aperture diameter F-number of the APD filter 203 by the following formula 1.

$$T = F/P^{1/2}$$ (Formula 1)

In the Formula 1, the average value of the light transmittance P in the entire area within the light flux passing aperture formed by the aperture diaphragm 204 is used.

The APD filter 203 has optical characteristics in which the optical transmittance of the peripheral portion of the lens 202 is reduced with respect to the optical axis center, that is, the optical transmittance of the APD filter 203 depends on the aperture diameter of the aperture diaphragm 204, the amount of change in the T-value with respect to the change in the F-number decrease as the F-numbers become open. Therefore, a first range in which the relationship between the changes in the F-numbers and the changes in the T-values is proportional, and a second range in which the relationship between the changes in the F-numbers and the changes in the T-values is not proportional (for example, a range in which although the changes in the F-numbers are linear, in contrast the changes in the T-values are nonlinear, are present.

Figure 3:
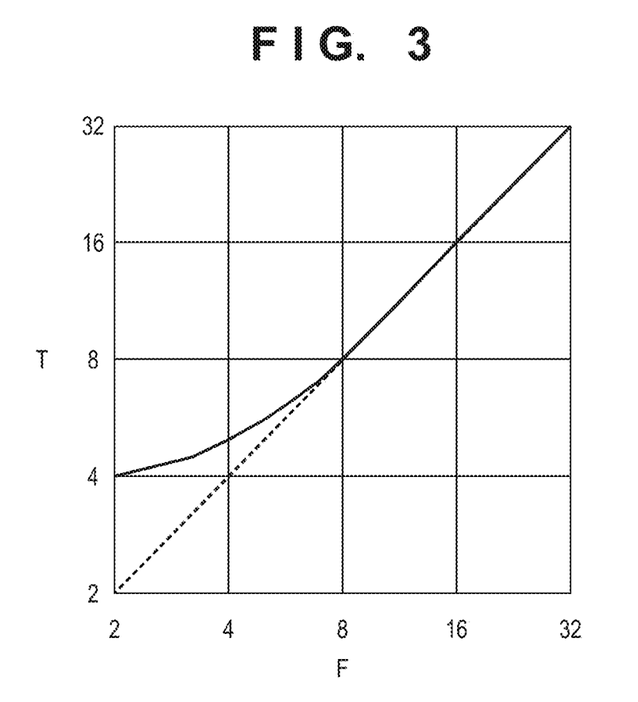
FIG. 3 illustrates a relationship between F-numbers and T-values of the lens on which the APD filter is mounted.

FIG. 3 is a diagram illustrating the relationship between the F-numbers and the T-values in a case where the APD filter 203 is mounted on the lens unit 200. In FIG. 3, the horizontal axis is the F-numbers determined by the aperture diameter of the aperture diaphragm 204. The vertical axis is T-values determined by the light transmittance P of the APD filter 203 and the F-numbers of the aperture diaphragm 204.

As shown in FIG. 3, the smaller the aperture diameter of the aperture diaphragm 204 (the F-numbers are large), the smaller the difference between the T-value and the F-number, the T-values and the F-numbers around the F-number of 8 correspond and changes linearly. On the contrary, the larger the aperture diameter of the aperture diaphragm 204 (the F-numbers are small), the larger the difference between the T-value and the F-number at the opening side than the F-number of 8 increases, the F-number changes linearly, in contrast the T-value changes nonlinearly. Then, at the maximum aperture, although the effect of the APD filter 203 becomes maximum, while the loss of the light amount becomes also maximum, at the small aperture, the light attenuation level decreases as the F-number increases, the effect of the APD filter 203 also reduces.

Next, the configuration and functions of the camera 100 will be described.

In FIG. 1, the camera mount 101 has a connection mechanism for mechanically connecting the lens unit 200 to the camera 100 and a communication terminal for communicatively connecting the lens unit 200 to the camera 100.

A shutter 102 is a focal plane shutter which is capable of freely controlling exposure time in an image capturing unit 103 which is capable of capturing a light flux of a subject incident through the lens unit 200 in accordance with an instruction of the camera control unit 107. The image capturing unit 103 includes an image sensor comprised of a photoelectric conversion element such as a CCD or a CMOS for converting a subject image formed by an image capture optical system comprising the lens unit 200 and the shutter 102 into electric signal, and an A/D converter for converting analog signal output from the image sensor into digital signal. In the present embodiment, the exposure time of the image capturing unit 103 is adjusted by the focal plane shutter, but the present invention is not limited to this, and for example, the image capturing unit 103 may have an electronic shutter function, and the exposure time may be adjusted by control pulses.

An image signal processing unit 104 performs processing such as a white balance, a color interpolation, a color correction, a gamma conversion, an edge enhancement, a resolution conversion and a noise reduction, and analysis processing such as a brightness and a contrast of an image for the digital image data transferred from the image capturing unit 103, and outputs the processed image data to a memory 105. The analysis result data output from the image signal processing unit 104 is used for an exposure control and an auto focus control.

The memory 105 is a RAM that temporarily stores image data output from the image signal processing unit 104, programs and data read from a nonvolatile memory 106, and the like. The nonvolatile memory 106 is a ROM that stores constants, programs, and the like for the operation of the camera control unit 107. Here, the programs are programs for executing flowcharts to be described later.

A timing generator 108, under the control of the camera control unit 107, applies timing signal to the image capturing unit 103 and the image signal processing unit 104. Further, the timing generator 108, by controlling a reset timing of the electric charge accumulated in the image capturing unit 103, can control the operations of charge accumulation and discharge in the image capturing unit 103.

A bus 109 connects the camera mount 101, the memory 105, the nonvolatile memory 106, the timing generator 108, a power supply unit 110, a display control unit 111, a touch panel 112, a recording medium interface 113, and an operation unit 114 so as to enable data communication with each other, and is connected to various switches. Note that the various switches described above include a main switch 121, a first shutter switch 122 and a second shutter switch 123.

The operation unit 114 is an input device for accepting a user operation including, for example, a pointing device such as a mouse or a touch pad, a determination button, up, down, left, right buttons, a dial, a joystick, and the like.

The power supply unit 110 supplies power to each components provided inside the camera 100.

The display control unit 111 converts the display image data stored in the memory 105 from the digital image data to the analog image data for display in a D/A conversion unit 115 according to the timing signal applied from the timing generator 108 via the bus 109. Converted analog image data is displayed on a display unit 116 such as an LCD or an organic EL or an external display device (not shown) via an analog output unit 117 or a digital output unit 118. The analog output unit 117 is, for example, composite terminal, S-video terminal, D terminal, component terminal, analog RGB terminal, the digital output unit 118 is, for example, DVI terminal, HDMI® terminal.

The touch panel 112 is integrally configured to the display surface of the display unit 116, and can detect the touch operation of the user on the display surface of the display unit 116, and notifies the camera control unit 107 of the position touched by the user as the coordinate information.

A recording medium slot 119 is configured such that the recording medium 120 such as a memory card is attachable/detachable. The recording medium 120 is electrically connected to the recording medium interface 113 while being mounted in the recording medium slot 119, and can record the image data stored in the memory 105 to the recording medium 120 and read the data recorded in the recording medium 120.

The camera control unit 107 is an arithmetic processing unit such as a CPU or an MPU that controls the entire camera 100. The camera control unit 107 executes programs stored in the nonvolatile memory 106, thereby realizing processing of flowcharts to be described later. The memory 105 is also used as a work memory for expanding constants and variables for the operation of the camera control unit 107, programs read from the nonvolatile memory 106, and the like. Further, the camera control unit 107 performs an automatic exposure control to be described later.

In the present embodiment, the camera control unit 107 controls the operation of each component of the camera 100 by controlling the image signal processing unit 104, the timing generator 108, and the display control unit 111 via the bus 109. Further, the camera control unit 107 instructs the lens control unit 207 via the communication terminal of the camera mount 101. Note that the camera control unit 107 may be configured to directly control the operation of each component of the camera 100, the operation of each component of the camera 100 may be controlled by the image signal processing unit 104, the timing generator 108 and the display control unit 111 cooperatively performing controls (processing).

[Basic Operation of the Camera 100]

Next, a basic operation of the camera 100 according to the present embodiment will be described with reference to FIG. 1. First, when the main switch 121 is turned on by the user, the power supply unit 110 supplies power to each component of the camera 100.

When power supply to each component of the camera 100 is performed, the subject image being the light flux of the subject incident through the aperture diaphragm 204 of the lens unit 200 is formed on the image sensor of the image capturing unit 103. Next, the image data is periodically taken from the image capturing unit 103 (e.g., 60 times/second), executed in various processing, and then expanded in a VRAM of the memory 105. As a result, the image data taken from the image capturing unit 103 can be sequentially displayed on the display unit 116 (a live view).

The user can select and set various parameters using a GUI displayed on the display unit 116 of the camera 100 by operating the operation unit 114. For example, the user can perform settings about the exposure such as the F-number, the T-value, and a shutter speed.

While as a shutter button (not shown) provided on the digital camera 100 is being operated, that is, pressed halfway (a shooting preparation instruction), the first shutter switch 122 is turned on and generates first shutter switch signal SW1. Upon receiving the first shutter switch signal SW1, the camera control unit 107 applies control signal to the lens control unit 207, and starts shooting preparation operations such as AF (auto focus) processing, AE (auto exposure) processing, AWB (auto white balance) processing, and EF (flash pre-emission) processing.

When the operation of the shutter button (not shown) is completed, that is, the shutter button is pressed fully (a shooting instruction), the second shutter switch 123 is turned on and generates second shutter switch signal SW2. Upon receiving the second shutter switch signal SW2, the camera control unit 107 starts a series of shooting processing from reading out the signal from the image capturing unit 103 to writing of the captured image as an image file to the recording medium 120.

[Control Processing when the Lens Unit is Mounted]

Figure 4:
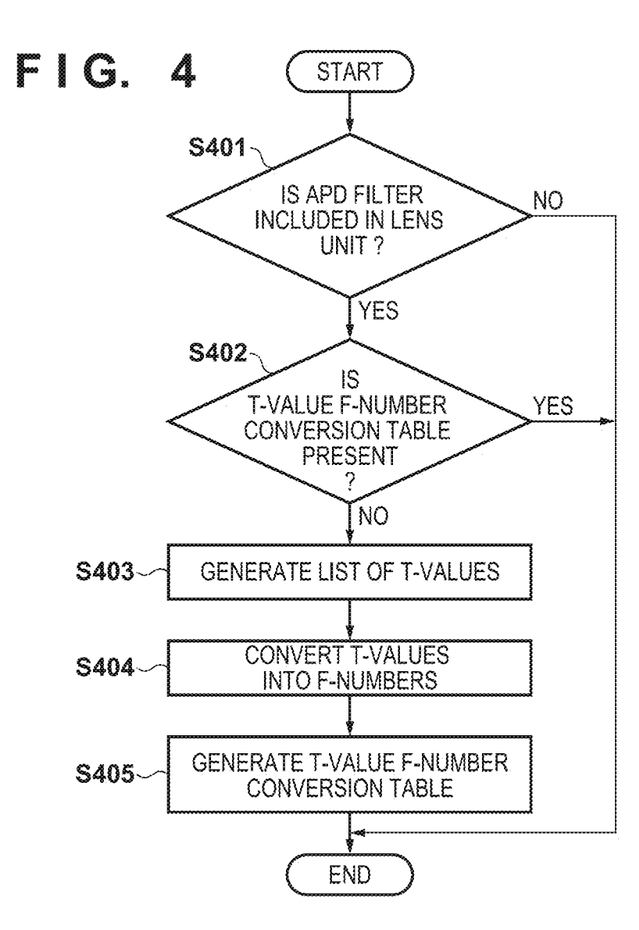
FIG. 4 is a flowchart illustrating processing when the lens unit is mounted on the camera according to the present embodiment.

Next, control processing in a case where the lens unit 200 is mounted on the camera 100 according to the present embodiment will be described with reference to FIG. 4.

Depending on a type of the lens unit 200 mounted on the camera 100, presence or absence of the APD filter and characteristics of the APD filter are different. That is, the relationship between the F-numbers and the T-values as shown in FIG. 3 varies depending on the type of the lens unit 200. Therefore, when the lens unit 200 is replaced, it is necessary to update the relationship between the F-numbers and the T-values. The processing of FIG. 4 is realized by the camera control unit 107 expanding the program stored in the nonvolatile memory 106 into the memory 105 and executing the program to control each component of the camera 100, and is started when it is detected that the lens unit 200 is mounted on the camera 100.

In step S401, the camera control unit 107 determines whether the APD filter 203 is included in the lens unit 200. The camera control unit 107 can confirm presence or absence of the APD filter 203 by inquiring the lens control unit 207. The camera control unit 107 advances the processing to step S402 when the camera control unit 107 determines that the APD filter 203 is present, and ends the processing when the camera control unit 107 determines that the APD filter 203 is not present.

In step S402, the camera control unit 107 determines whether or not a T-value F-number conversion table is stored. The T-value F-number conversion table is a parameter table indicating a correspondence between the F-numbers and the T-values determined by the type of the lens unit 200, and details thereof will be described later. By storing the plurality of the T-value F-number conversion tables in the nonvolatile memory 106 in advance, it is possible to omit processing of generating the T-value F-number conversion table. The step S402 may be omitted as the premise of not storing the T-value F-number conversion tables in the nonvolatile memory 106 and always generating the T-value F-number conversion table. The camera control unit 107 advances the processing to step S403 when the camera control unit 107 determines that the T-value F-number conversion table corresponding to the lens unit 200 is not present in the nonvolatile memory 106, and ends the processing when the camera control unit 107 determines that the T-value F-number conversion table is present.

In step S403, the camera control unit 107 generates a list of the T-values that can be set by the user. For example, if the user can change the T-value at constant intervals in units of ⅓ level, the list of the T-values is generated as shown in the left column of FIG. 5. The camera control unit 107 can acquire minimum or maximum T-value that can be set for the lens unit 200 by inquiring the lens control unit 207.

In step S404, the camera control unit 107 performs processing of converting the list of the T-values generated by step S403 into the F-numbers corresponding to the respective T-values in the list. The camera control unit 107 can perform conversion from the T-values to the F-numbers by inquiring the lens control unit 207 about the F-numbers corresponding to the respective T-values. Alternatively, the camera control unit 107 may acquire a method of converting the T-values to the F-numbers from the lens control unit 207, and may perform the conversion from the T-values to the F-numbers.

Figure 5:
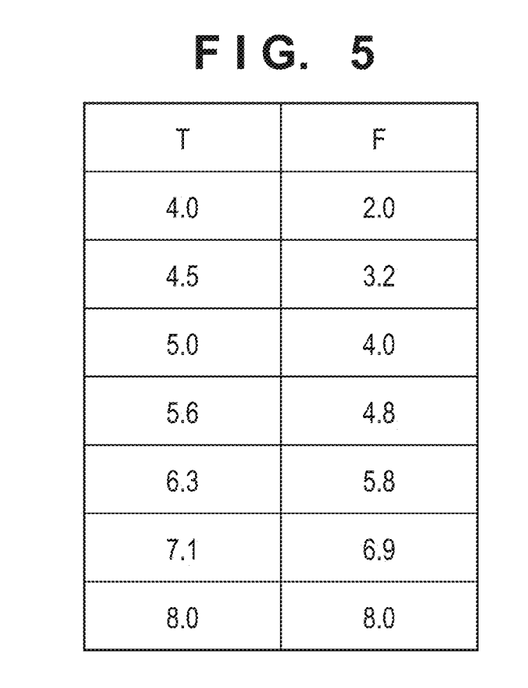
FIG. 5 illustrates a T-value F-number conversion table according to the present embodiment.

In step S405, the camera control unit 107 generates the T-value F-number conversion table using the conversion result performed in step S404. FIG. 5 is an example of the T-value F-number conversion table, and the F-numbers corresponding to the respective T-values are stored.

In the above-described control, the T-value F-number conversion table is not generated for the lens without the APD filter, but the T-value F-number conversion table may be generated for the lens without the APD filter.

[Control Processing when the Aperture Change Operation is Performed]

Next, control processing in a case where the user performs the aperture change operation for changing the setting of the F-number in the camera 100 according to the present embodiment will be described with reference to FIGS. 6 and 7.

Figure 6:
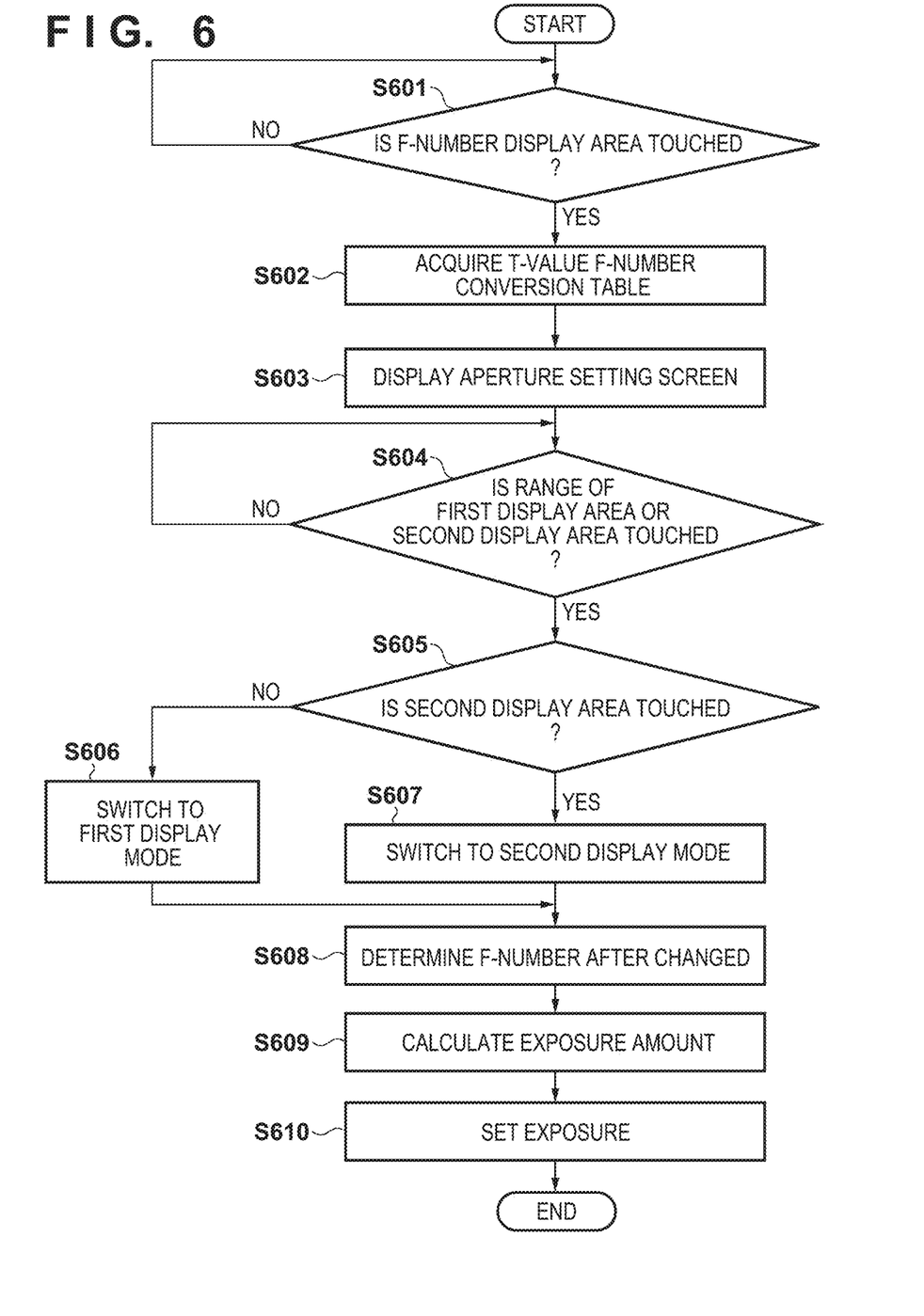
FIG. 6 is a flowchart illustrating processing when an aperture change operation is performed in the camera according to the present embodiment.

The processing of FIG. 6 is realized by the camera control unit 107 expanding a program stored in the nonvolatile memory 106 in the memory 105 and executing the program to control each component of the camera 100. The same applies to FIG. 8 to be described later.

When starting the processing of FIG. 6, the camera control unit 107 controls the display control unit 111 in advance to display an aperture setting screen for setting the F-numbers on the display unit 116. FIGS. 7A to 7C are examples of the aperture setting screens displayed on the display unit 116. In FIG. 7A, a live view image is displayed on the aperture setting screen 701. The display area 702 indicates the shutter speed currently set, the display area 703 indicates the F-number currently set, the display area 704 indicates the ISO sensitivity currently set, respectively.

In FIG. 6, in step S601, the camera control unit 107 monitors a notification from the touch panel 112 and determines whether or not the display area 703 indicating the F-number is touched. The camera control unit 107 returns the processing to step S601 when the camera control unit 107 determines that the display area 703 indicating the F-number is not touched, monitors the notification from the touch panel 112, and advances the processing to step S602 when the camera control unit 107 determines that the display area 703 indicating the F-number is touched.

In step S602, the camera control unit 107 acquires the T-value F-number conversion table. As the T-value F-number conversion table, a table generated when the lens unit 200 is mounted is used. The T-value F-number conversion table may not be generated when the lens unit 200 is mounted, but may be generated by executing the same processing in step S602.

In step S603, the camera control unit 107 controls the display control unit 111 to display the aperture setting screen on the display unit 116. A first display area 711 and a second display area 712 in the aperture setting screen 701 of FIG. 7A are display areas for changing the F-number, and scale and the F-number that can be set by the user, including the currently set F-number, are displayed. In the first display area 711, the F-number can be selected at a constant interval, for example, in units of ⅓ level. In the second display area 712, the F-numbers that can be selected by the user, including the currently set F-number for a case that the T-values change at constant intervals (for example, in units of ⅓ level), are displayed discretely with reference to the changes in the T-values (that is, displayed at indefinite intervals that are not constant intervals). In the second display area 712, the interval of the scale is determined from the T-value F-number conversion table as shown in FIG. 5. The highlight area 705 identifiably displays the scale position corresponding to the F-number selected by the user in the first display area 711 or the second display area 712.

Note that the range in which the intervals of the scale are common between the first display area 711 and the second display area 712 may be displayed in both of the first display area 711 and the second display area 712, or may be displayed in either of the first display area 711 and the second display area 712. Further, in step S603, it may be controlled in a case where the APD filter 203 is included in the lens unit 200, to display the second display area 712 only when a second range in which the relationship between the changes of the F-numbers and the changes of the T-values is not proportional is present, that is, when the F-number set by the user is included in the second range, to display the second display area 712, and not to display the second display area 712 when the F-number set by the user is not included in the second range.

In step S604, the camera control unit 107 monitors the notification from the touch panel 112 and determines whether or not the range of the first display area 711 or the second display area 712 in the aperture setting screen 701 has been touched. The camera control unit 107 returns the processing to step S604 when the camera control unit 107 determines that the range of the first display area 711 or the second display area 712 has not been touched, and monitors the notification again. When the camera control unit 107 determines that the range within the first display area 711 or the second display area 712 has been touched, the camera control unit 107 advances the processing to step S605.

In step S605, the camera control unit 107 determines which range of the first display area 711 and the second display area 712 has been touched based on the touch detection position of the touch panel 112. The camera control unit 107 advances the processing to step S606 when the camera control unit 107 determines that the range of the first display area 711 has been touched, and advances the processing to step S607 when the camera control unit 107 determines that the range of the second display area 712 has been touched.

In step S606, the camera control unit 107 switches the display mode to the first display mode in which the user can set the F-numbers at intervals at which the changes of the F-numbers become constant. In step S607, the camera control unit 107 switches the display mode to the second display mode in which the user can set the F-numbers at intervals at which the changes of the T-values become constant. The switching between the first display mode and the second display mode may be enabled when the F-numbers are changed in the second range in which the relationship between the changes of the F-numbers and the changes of the T-values is not proportional (see FIG. 3).

In step S608, the camera control unit 107 determines the scale position of the first display area 711 or the second display area 712 that is closest to the touch detection position acquired in step S605. The F-number selected by the user is determined from the scale position.

In step S609, the camera control unit 107, based on the F-number determined in step S608, determines the exposure amount by applying a predetermined program diagram. The F-number determined in step S608 is stored in the memory 105 until the shooting processing starts as the setting value for shooting.

In step S610, the camera control unit 107, based on the exposure amount determined in step S609, adjusts the exposure amount or gain of the image capturing unit 103 and the aperture diameter of the aperture diaphragm 204 to be reflected in a brightness of the live view display, and ends the processing.

Figure 7A:
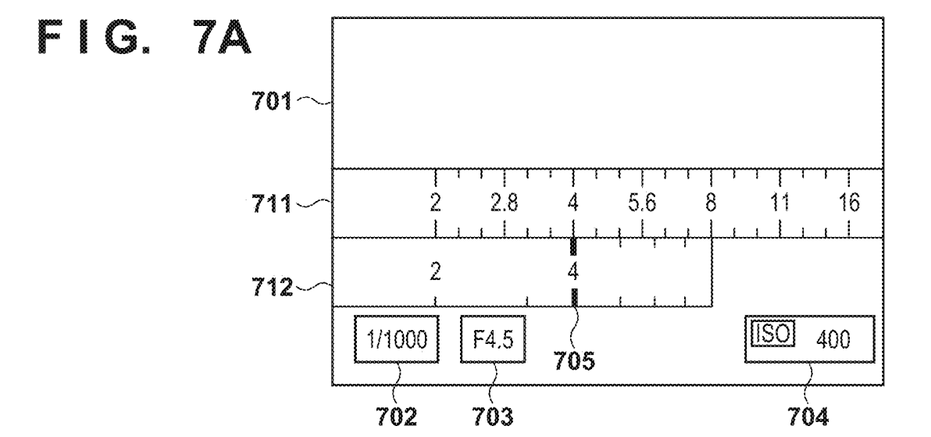
FIGS. 7A to 7C illustrate examples of aperture setting screens in the camera according to the present embodiment.
Figure 7B:
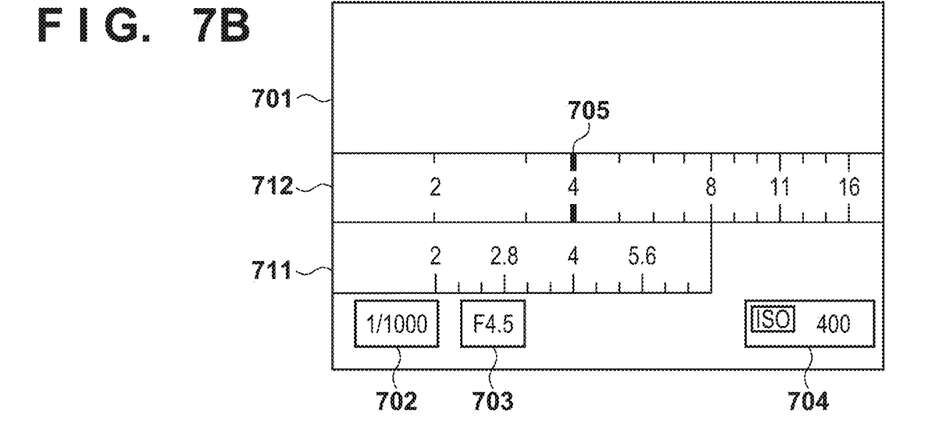
Figure 7C:
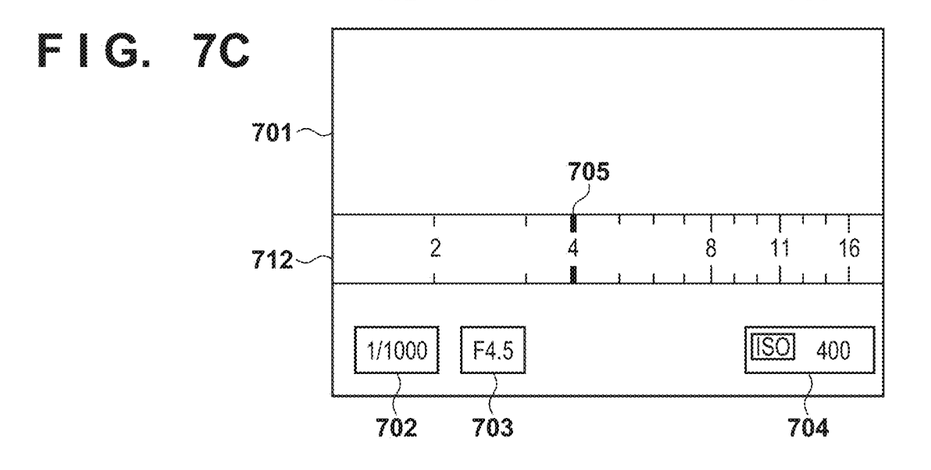

In step S607 of FIG. 6, when the user starts the processing of changing the aperture again after switching to the second display mode, the arrangement of the first display area 711 and the second display area 712 may be switched from the state of FIG. 7A to the state of FIG. 7B to clearly indicate to the user that the first display mode has been switched to the second display mode.

In the processing of FIG. 6, the display mode set when the power of the camera 100 is turned off may be stored, and may be set as the default display mode when the camera 100 is activated.

In the processing of FIG. 6, the first display mode and the second display mode are switched depending on the area touched by the user, but the user may select them in advance on a menu screen or the like. In this case, only a preset display area is displayed as shown in FIG. 7C.

In the processing of FIG. 6, the F-numbers are changed by the touch operation, but the F-numbers may be changed by a dial operation included in the operation unit 114.

Figure 8:
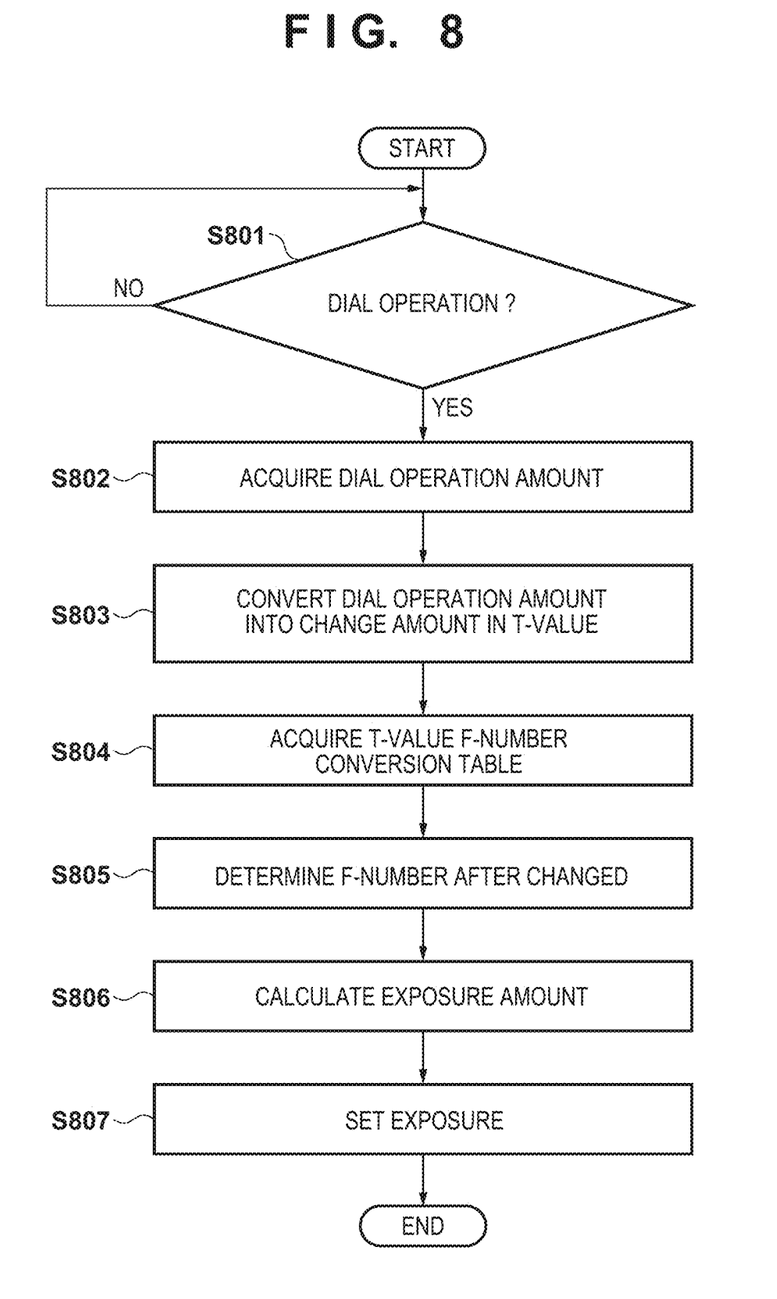
FIG. 8 is a flowchart illustrating modified processing when the aperture change operation is performed in the camera according to the present embodiment.

FIG. 8 illustrates control processing when the aperture change operation is performed by the dial operation.

In the processing of FIG. 8, it is assumed that the control is started in a state in which the second display mode is set in advance by the user on the menu screen or the like.

In step S801, the camera control unit 107 monitors the dial operation of the operation unit 114, returns the processing to step S801 when the camera control unit 107 determines that the dial operation is not detected, and continues monitoring of the dial operation. Further, the camera control unit 107 advances the processing to step S802 when the dialing operation is detected.

In step S802, the camera control unit 107 acquires the dial operation amount.

In step S803, the camera control unit 107 converts the dial operation amount acquired in step S802 into the amounts of changes in the T-values. For example, when the T-value is changed in units of ⅓ level for each unit of one operation amount of the dial, the T-value is changed in ⅔ level when the operation for two units is detected. In this case, for example, if the T-value before changed is 4.0, the T-value after changed is 5.0.

In step S804, the camera control unit 107 acquires the T-value F-number conversion table. For example, in a case of the table as shown in FIG. 5, since the F-number corresponding to the T-value of 5.0 is 4.0, the F-number after changed is 4.0.

In step S805, the camera control unit 107 controls the display control unit 111 to display the F-number after changed in the setting screen. In this case, since only the F-numbers may be displayed, for example, as in the display area 703 of FIG. 7A, the F-numbers may be displayed on a part of the display unit 116, or the camera 100 may be configured to include a separate device for displaying only the F-numbers.

The steps S806 to S807 are the same as the steps S609 to S610 in FIG. 6.

As described above, according to the present embodiment, it is possible for the user to set the F-numbers while easily grasping the relationship between the F-numbers and the T-values of the lens unit.

In the present embodiment, the relationship between the T-values and the F-numbers of the lens unit has been described as an example, but the present invention is not limited to this, and other parameters may be used.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processor (e.g., central processing unit (CPU), micro processing unit (MPU)) and may include a network of separate computers or separate processor to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-004499, filed Jan. 14, 2021 which is hereby incorporated by reference herein in its entirety.

What is claimed is:

1. An image capture apparatus comprising:
an image sensor configured to capture a light flux of a subject incident through an aperture;
at least one processor or circuit configured to perform the operations of the following units;
a setting unit configured to set a first value relating to an aperture diameter; and
a display control unit configured to perform display control when displaying on a display unit a plurality of settable values relating to the aperture diameter and including the first value currently set in the image capture apparatus,
wherein the display control unit controls such that, when a first range in which changes in first values relating to the aperture diameter and changes in second values indicating a lens brightness that are different from the first values are proportional and a second range in which the changes in the first values and the changes in the second values are not proportional are present as the plurality of settable values by the setting unit, the changes in the first values are displayed discretely in the second range with reference to the changes in the second values.

2. The image capture apparatus according to claim 1, wherein the display control unit controls the display unit to display a first display area in which the first values are displayed to be selectable at predetermined intervals when the first values are included in the first range, and a second display area in which the first values selectable when the second values are changed at a predetermined interval are discretely displayed when the first values are included in the second range.

3. The image capture apparatus according to claim 2, wherein the at least one processor functions as an acquiring unit configured to acquire a conversion table indicating a correspondence between the first values and the second values of the lens, from a lens mounted on the image capture apparatus,
wherein the display control unit determines intervals of the first values settable when the second values change at the predetermined interval in the second display area based on the conversion table acquired by the acquiring unit.

4. The image capture apparatus according to claim 3, wherein the at least one processor functions as
a generating unit configured to generate the conversion table of the second values and the first values of the lens mounted on the image capture apparatus, when the acquiring unit cannot acquire the conversion table,
wherein the display control unit determines intervals of the first values settable when the second values change at the predetermined interval in the second display area based on the conversion table generated by the generating unit.

5. The image capture apparatus according to claim 2, wherein
the display control unit can switch to a first display mode in which the first values selectable in the first display area are displayed at predetermined intervals, or a second display mode in which changes in the first values selectable when the second values change at the predetermined interval in the second display area are displayed discretely.

6. The image capture apparatus according to claim 5, wherein
the display control unit sets the display mode set when the power of the image capture apparatus is turned off as a display mode when the image capture apparatus is activated.

7. The image capture apparatus according to claim 1, wherein
the first value is an F-number relating to the aperture diameter, the second value is a T-value relating to a transmittance of light transmitting through a lens, and the lens is attachable to/detachable from the image capture apparatus and equipped with an apodization (APD) filter.

8. The image capture apparatus according to claim 1, further comprising:
a touch panel configured to accept an operation of a user for setting the first value,
wherein the touch panel detects a touch operation of the user, and
the display control unit controls such that the changes in the first values with respect to one operation of the touch panel is different depending on whether the first values set by the setting unit is included in the first range or included in the second range.

9. A method of controlling an image capture apparatus having an image sensor configured to capture a light flux of a subject incident through an aperture, the method comprising:
setting a first value relating to an aperture diameter; and
performing display control when displaying on a display unit a plurality of settable values relating to the aperture diameter and including the first value currently set in the image capture apparatus,
wherein in the display control, when a first range in which changes in first values relating to the aperture diameter and changes in second values indicating a lens brightness that are different from the first values are proportional and a second range in which the changes in the second values are not proportional are present as the plurality of the settable values in the setting, the display unit is controlled such that the changes in the first values are displayed discretely in the second range with reference to the changes in the second values.

10. A non-transitory computer-readable storage medium storing a program that causes a computer to execute a method of controlling an image capture apparatus having an image sensor configured to capture a light flux of a subject incident through an aperture, the method comprising:

setting a first value relating to an aperture diameter; and performing display control when displaying on a display unit a plurality of settable values relating to the aperture diameter and including the first value currently set in the image capture apparatus, wherein in the display control, when a first range in which changes in first values relating to the aperture diameter value and changes in second values indicating a lens brightness that are different from the first values are proportional and a second range in which the changes in the second values are not proportional are present as the plurality of the settable values in the setting, the display unit is controlled such that the changes in the first values are displayed discretely in the second range with reference to the changes in the second values.

11. The image capture apparatus according to claim 1, further comprising:

an operation dial configured to accept an operation of a user for setting the first value, wherein the operation dial detects an operation of the user, and the display control unit controls such that the changes in the first values with respect to one operation of the operation dial is different depending on whether the first value set by the setting unit is included in the first range or included in the second range.

* * * * *